(12) United States Patent
Lee

(10) Patent No.: US 7,494,266 B2
(45) Date of Patent: Feb. 24, 2009

(54) COOKING MIXER FOR SUPPLYING SILVER

(76) Inventor: Sang-Jin Lee, A-501, Sung-Bo Villa, 1240-9, Oncheon 3 Dong, Dongrae-Gu, Busan, 607-063 (KR)

( * ) Notice: Subject to any disclaimer, the term of this patent is extended or adjusted under 35 U.S.C. 154(b) by 342 days.

(21) Appl. No.: 11/278,787

(22) Filed: Apr. 5, 2006

(65) Prior Publication Data

US 2006/0231656 A1   Oct. 19, 2006

(30) Foreign Application Priority Data

Apr. 6, 2005   (KR) .................. 20-2005-0009292 U
Jan. 13, 2006   (KR) .................. 20-2006-0001153 U

(51) Int. Cl.
 *A47J 43/046*   (2006.01)
(52) U.S. Cl. ..................... 366/205; 241/282.2
(58) Field of Classification Search ......... 366/197–207, 366/314, 328.2–328.4; 241/282.1–282.2; 99/348; 416/231 R–231 B
See application file for complete search history.

(56) References Cited

U.S. PATENT DOCUMENTS 2,086,858 A * 7/1937 Dunkelberger .............. 366/314
3,603,364 A * 9/1971 Samuelian et al. ...... 241/199.12
5,943,950 A * 8/1999 Taoda et al. .................... 99/485
5,983,507 A * 11/1999 Hirai ............................ 30/350
6,210,033 B1 * 4/2001 Karkos et al. ............... 366/274
6,605,252 B2 * 8/2003 Omasa ........................ 422/20
7,316,501 B2 * 1/2008 Thoma .................... 366/168.1
2006/0231656 A1 * 10/2006 Lee ......................... 241/282.2

FOREIGN PATENT DOCUMENTS

EP           1709877 A1 * 10/2006
JP        2000051103 A  *  2/2000

* cited by examiner

*Primary Examiner*—Charles E Cooley
(74) *Attorney, Agent, or Firm*—Lowe Hauptman Ham & Berner LLP

(57) ABSTRACT

Cooking mixer supplies silver, enabling a user to take silver and foods by supplying silver to the foods during food grinding. The cooking mixer includes a container for foodstuffs to be ground, a generating power part, a connection part for connecting the container to the power part, and a rotating body mounted in the connection part and connected to a rotary shaft of the power part, the rotating body having a plurality of blades for grinding the foodstuffs, each of the mixer blades has at least one insertion space for inserting a silver body thereto. The cooking mixer naturally supplies silver to foods to be ground, for example, when fruit juice is made or foodstuffs are chopped, thereby allowing a person to regularly take silver and detect poisonous matters contained in foods. The cooking mixer protects human health.

6 Claims, 6 Drawing Sheets

Fig. 4a
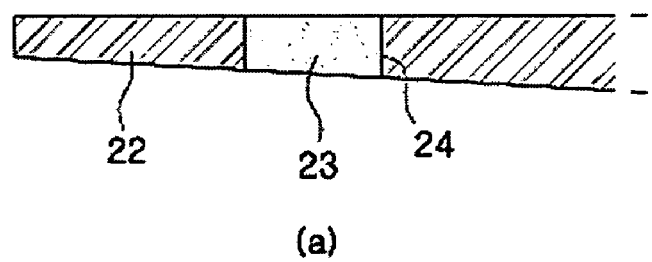
(a)
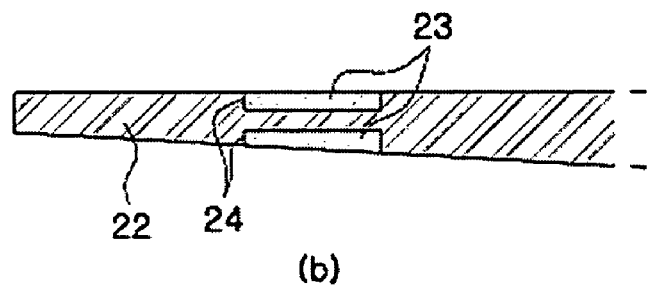
(b)
Fig. 4b
Fig. 5
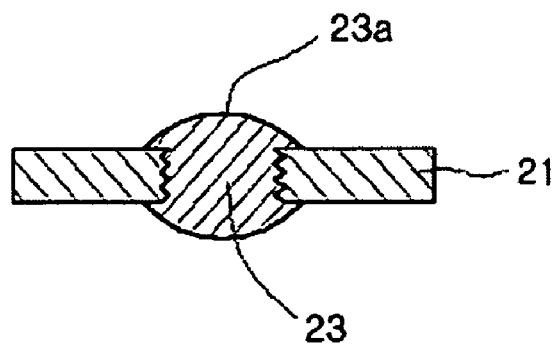

COOKING MIXER FOR SUPPLYING SILVER

RELATED APPLICATIONS

The present application is based on, and claims priority from, Korean Application Number 20-2005-0009292, filed Apr. 6, 2005, and Korean Application No. 20-2006-0001153, filed Jan. 13, 2006, the disclosures of which are hereby incorporated by reference herein in their entirety.

BACKGROUND OF THE INVENTION

1. Field of the Invention

The present invention relates to a cooking mixer for supplying silver, and more particularly, to a cooking mixer for supplying silver, which can supply silver into foods grinded by a mixer by mounting a silver body on a mixer blade body having a plurality of blades.

2. Background Art

As shown in FIG. 1, a general cooking mixer 100 includes a container 110 for containing foodstuffs to be grinded, a power part 130 for generating power, a connection part 120 for separately connecting the container 110 to the power part 130, and a rotating body 20 connected to a rotary shaft of the power part 130 in a state where the connection part 120 is interposed between the connection part 120 and the rotating body 20, and having a plurality of blades 22 for grinding the foodstuffs.

In a state where the foodstuffs to be grinded are contained in the container 110 of the cooking mixer 100, the rotating body 20 is rotated by the power part 130, whereby the blades 22 of the rotating body 20 grind and mix the foodstuffs. Therefore, the mixing cooker can pulverize nuts such as walnuts or peanuts into powder by grinding them, or crush out fruit juice by grinding fruits such as apples or pears.

Meanwhile, silver has been widely used not only as noble metal but also as artistic materials or monetary materials, and also widely used as tableware materials since it has been informed that silver can detect poisonous matters and acts as an element helpful to a human body. Moreover, it has been informed that, when a person carries silver with him or her, it is of sovereign remedy in curing various mental diseases, such as epilepsy and convulsions, and women's diseases. Additionally, it has been also informed that silver serves to remove various foreign matters and pathogenic organs existing in a human body and recover injured or damaged tissues since it acts as antibiotics with no ill effect. In addition, folk remedies that people wash their eyes with mineral water can take effect since mineral water contains silver, silkworms which eat mulberry leaves are of sovereign remedy in invigoration and curing diabetes since the silkworms have a great deal of silver, and a plaster is also of sovereign remedy in swelling since it contains silver.

However, since silverwares just have some functions of containing foods, decoration, and detection of poisonous matters, the silverwares have a limitation in providing actions helpful to a human body by regularly eating and taking silver ingredient.

Meanwhile, Korean Utility Model Registration No. 226427 discloses a pot lid for supplying silver to foods, which can supply silver to foods during cooking. Moreover, Korean Utility Model Registration Nos. 378465 and 378466 respectively disclose cooking scissors and a kitchen knife with silver attached thereon, which can naturally supply silver to foods during cutting cooked foods or live foods such as live vegetables or live fishes before cooking the foods.

However, the prior arts have a disadvantage in that it is difficult to apply the above technologies to foods to be grinded, for instance, when a user crushes out juice or chops foods.

SUMMARY OF THE INVENTION

Accordingly, a preferred embodiment of the present invention has been made to solve the above-mentioned problems occurring in the prior art, and it is an object of the present invention to provide a cooking mixer for supplying silver, which can naturally supply silver to foods to be grinded, thereby allowing a person to regularly take silver and detecting poisonous matters contained in foods.

It is another object of the present invention to provide a cooking mixer for supplying silver that a silver body protrudes from a mixer blade of a rotating body and a screw and a washer contain silver therein, thereby increasing the person's silver intake by increasing silver content in foods since a contact area between foodstuffs and silver is increased.

It is a further object of the present invention to provide a cooking mixer for supplying silver that the mixer blade and the silver body are firmly connected with each other, thereby increasing durability by preventing separation of the silver body from the mixer blade in spite of a long-term use.

To accomplish the above object, according to the preferred embodiment of the present invention, a cooking mixer for supplying silver includes a container for containing foodstuffs to be grinded, a power part for generating power, a connection part for separately connecting the container to the power part, and a rotating body mounted in the connection part and connected to a rotary shaft of the power part, the rotating body having a plurality of blades for grinding the foodstuffs, wherein each of the mixer blades has at least one insertion space formed thereon for inserting a silver body thereto.

Furthermore, a screw and a washer for connecting the rotating body to the rotary shaft are made of silver or plated with silver.

Moreover, the insertion space is formed on the mixer blade in a hole shape or a groove shape.

Additionally, the insertion space has a screw thread formed on the inner periphery thereof, whereby a portion of the silver body mounted on the insertion space is fit into the screw thread, and the silver body has a projection protruding outwardly from the surface of the mixer blade.

Moreover, a slit which has a diameter larger than the inner diameter of the insertion space is formed on the inner periphery of the insertion space along the circumference of the insertion space, whereby the silver body mounted on the insertion space is fit into the slit.

The insertion space is formed in a hole shape, and the projections of the silver body mounted on the inner periphery of the insertion space are formed at the upper and lower sides of the mixer blade.

Additionally, the insertion space is preferably formed in a groove shape, and the projection of the silver body mounted on the inner periphery of the insertion space is formed only at the upper side of the mixer blade.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIGS. 4a and 4b are vertical sectional views of a mixer blade according to a preferred embodiment of the present invention;

FIG. 5 is a sectional view of the mixer blade combined with a silver body according to the preferred embodiment of the present invention;

DETAILED DESCRIPTION OF THE PREFERRED EMBODIMENT

Reference will be now made in detail to the preferred embodiment of the present invention with reference to the attached drawings.

Figure 1:
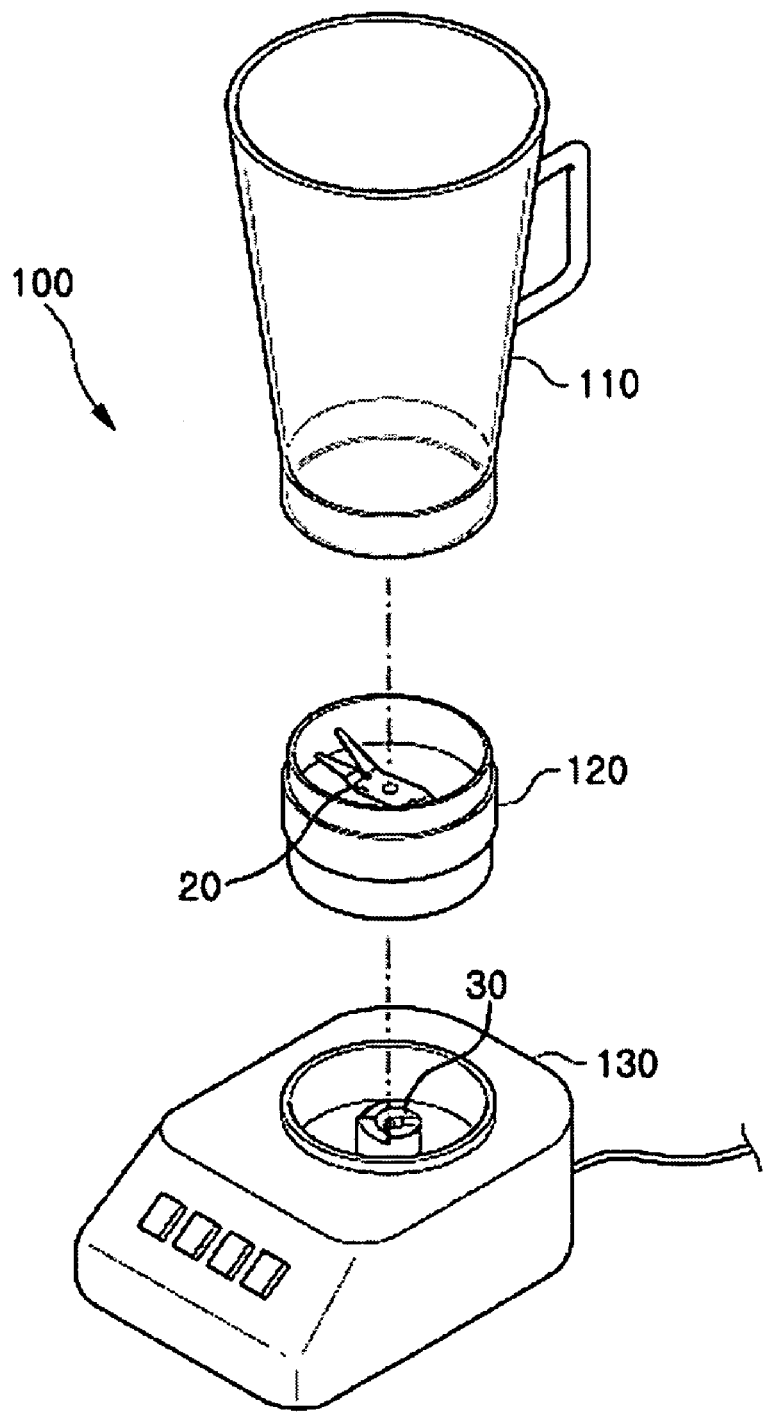
FIG. 1 is an exploded perspective view showing a conventional cooking mixer.
Figure 2:
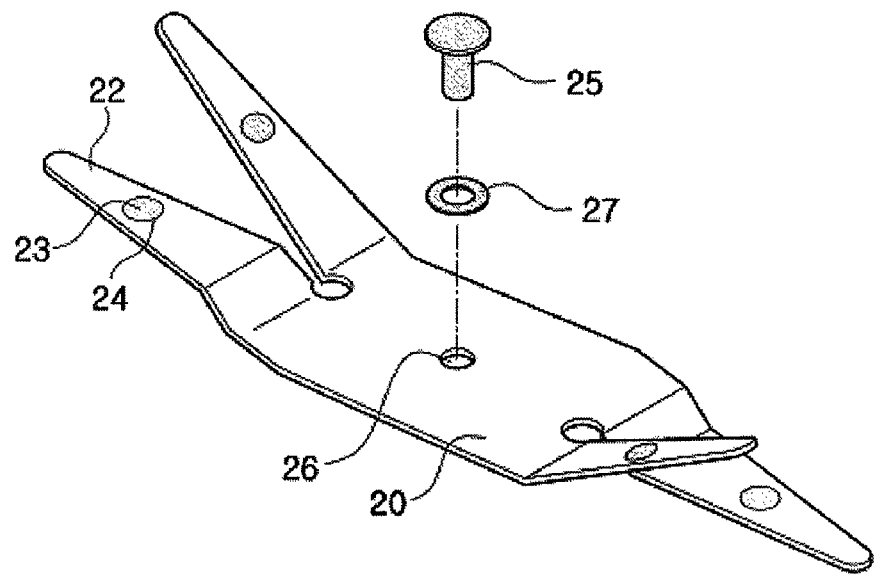
FIG. 2 is an exploded perspective view of a rotating body according to the preferred embodiment of the present invention.
Figure 3:
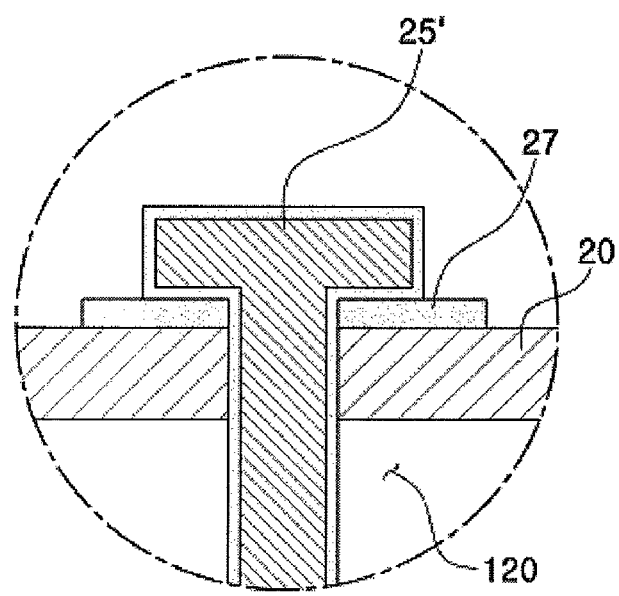
FIG. 3 is a vertical sectional view of a fixed structure of the rotating body according to the preferred embodiment of the present invention.
Figure 6:
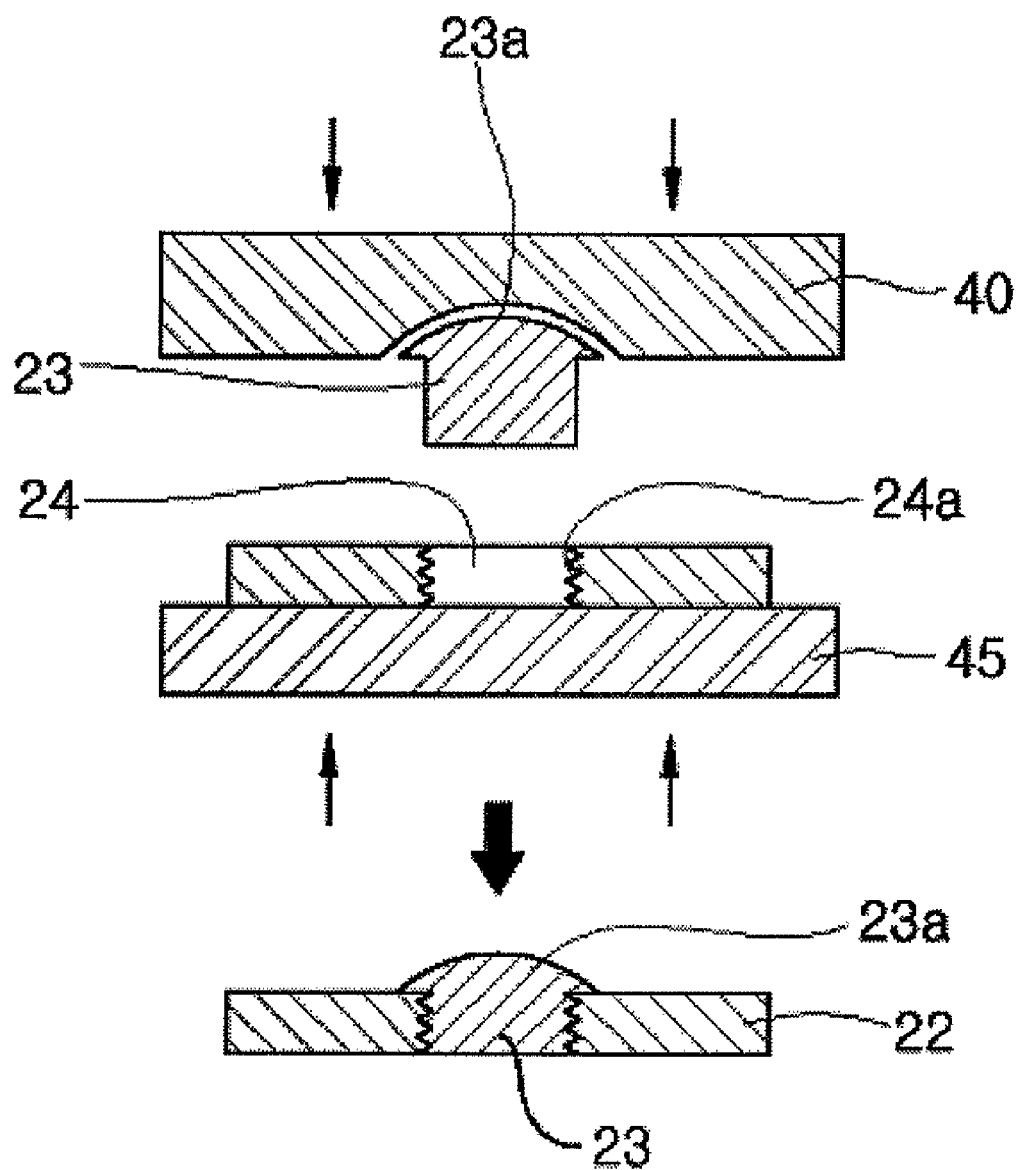
FIG. 6 is a sectional view of the silver body in combination with the mixer blade.
Figure 7:
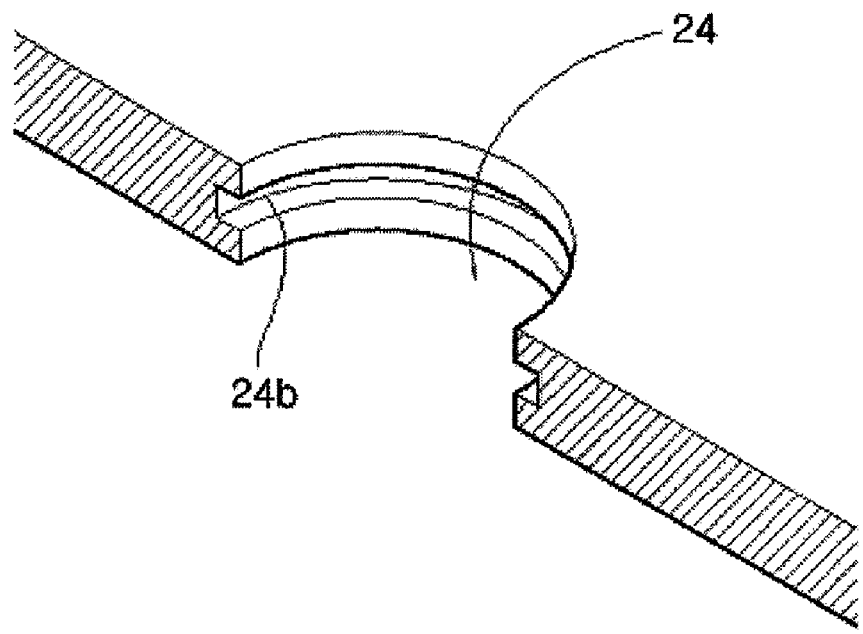
FIG. 7 is a view of the inside of an insertion space according the preferred embodiment of the present invention.
Figure 8:
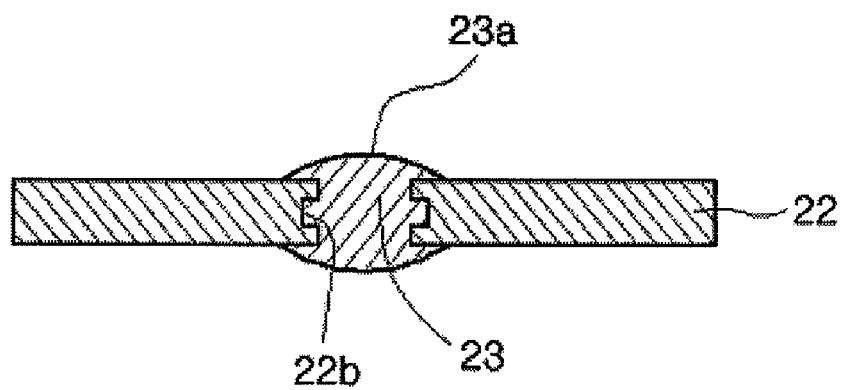
FIG. 8 is a sectional view of the silver body in the insertion space of FIG. 7.
Figure 9:
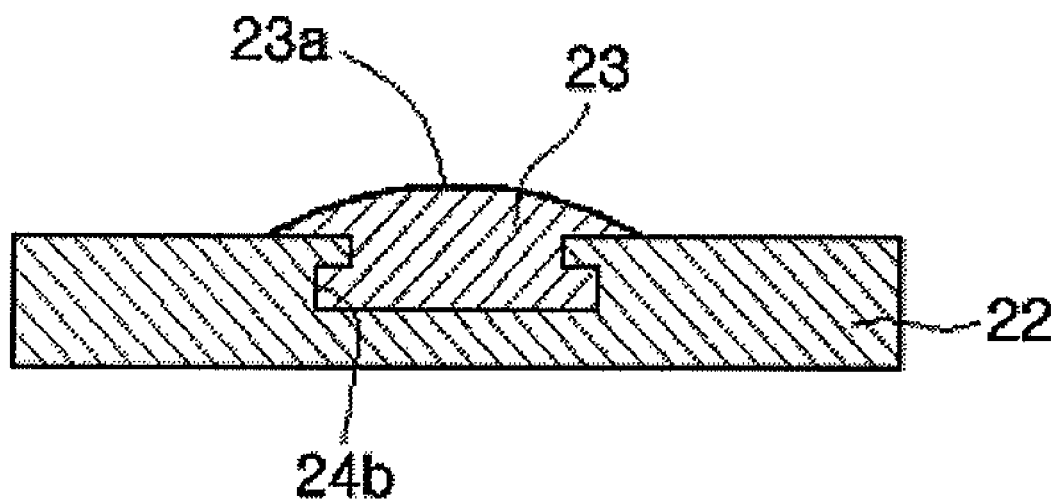
FIG. 9 is a sectional view of a combined part formed between the silver body and the mixer blade according to the preferred embodiment of the present invention.

FIG. 2 is an exploded perspective view of a rotating body according to the preferred embodiment of the present invention, FIG. 3 is a vertical sectional view of a fixed structure of the rotating body according to the preferred embodiment of the present invention, FIG. 4 is a vertical sectional view of a mixer blade according to the preferred embodiment of the present invention, FIG. 5 is a sectional view of the mixer blade combined with a silver body according to the preferred embodiment of the present invention, FIG. 6 is a sectional view of the silver body in combination with the mixer blade, FIG. 7 is a view of the inside of an insertion space according to the preferred embodiment of the present invention, FIG. 8 is a sectional view of the silver body in the insertion space of FIG. 7, and FIG. 9 is a sectional view of a combined part formed between the silver body and the mixer blade according to the preferred embodiment of the present invention.

The cooking mixer for supplying silver according to the preferred embodiment of the present invention includes a container 110 for containing foodstuffs to be grinded, a power part 130 for generating power, a connection part 120 for separately connecting the container 110 to the power part 130, and a rotating body 20 connected to a rotary shaft of the power part 130 in a state where the connection part 120 is interposed between the connection part 120 and the rotating body 20, and having a plurality of blades 22 for grinding the foodstuffs. The cooking mixer according to the preferred embodiment of the present invention has the same fundamental configuration as the prior art, and so, a detailed description of the configuration is omitted.

The cooking mixer for supplying silver according to the preferred embodiment of the present invention includes the rotating body 20 having a plurality of the mixer blades 22 for grinding foodstuffs contained in the container 110, and a screw 25 and a washer 27 for coupling the rotating body 20 to the rotary shaft 30. The mixer blades 22 are formed symmetrically at the outer edges of the rotating body 20, and each mixer blade 22 has at least one insertion space 24 formed thereon.

A silver body 23 is mounted in the insertion space 24 by one of general methods, such as thermofusion.

The insertion space 24 may be in a form of a hole as shown in FIG. 4(a), or in a form of a recess as shown in FIG. 4(b). It is preferable that the insertion spaces 24 be formed on both sides of the blade when the insertion space 24 is in the form of the recess.

Furthermore, the shape of the insertion space 24 is not restricted to the above proposed shapes, but can have various shapes.

Moreover, the screw 25 and the washer 27 are made of silver or a material plated with silver. Preferably, a stainless steel screw 25' which is generally used is plated with silver as shown in FIG. 3, to provide the screw 25 with sufficient strength. The screw 25 is inserted into a screw hole 26 and coupled with the rotary shaft 30, and the washer 27 made of silver is fit between the screw and the rotating body 20. By the above configuration, the cooking mixer according to the preferred embodiment of the present invention can supply more silver to foodstuffs which are grinded.

Meanwhile, the insertion space 24 formed on the mixer blade 22 has a screw thread portion 24a formed on the inner periphery thereof so as to enhance a binding force between the insertion space 24 and the silver body 23. That is, a portion of the silver body 23 fits between grooves of the screw thread portion 24a formed on the inner periphery of the insertion space 24, whereby the binding force between the silver body 23 and the insertion space 24 is increased. Here, the insertion space 24 has a circular shape, but the shape of the insertion space 24 is not restricted to the above and may be formed in various shapes, such as an elongated shape, an elliptical shape or a rectangular shape.

The silver body 23 can be mounted on the insertion space 24 by thermofusion, compression molding or other methods. In FIG. 6, the silver body 23 is mounted on the insertion space 24 by compression molding.

That is, an upper mold 40 having a concave portion formed on the bottom surface thereof for forming a projection 23a of the silver body 23 is located at one side of the mixer blade 22 having the insertion space 24, and a lower mold 45 having a flat upper surface is locate at the other side of the mixer blade 22. After that, the silver body 23 of a predetermined length is inserted into the insertion space 24, and the upper mold 40 is lowered, whereby the projection 23a having a diameter larger than that of the insertion space 24 is formed at the side of the mixer blade 22.

That is, when the upper mold 40 is lowered to the state where the silver body 23 of the predetermined length is inserted into the insertion space 24, a strong compression force acts between the upper mold 40 and the lower mold 45, and then, a portion of the silver body 23 is fit into the grooves of the screw thread 22a formed on the inner periphery of the insertion space 22 so as to provide strong fixing force while the silver body 23 is compressed by the compression force.

At this time, as shown in FIG. 5, to form the projections 23a of the silver body 23 at both sides of the mixer blade 22, the lower mold 45 has the same concave portion as the upper mold 40. As described above, when the projections 23a of the silver body 23 is formed at both sides of the mixer blade 22, since a contact area between the food and the silver body 23 is increase, silver content of the food is increased.

Finally, the strong compression force acts between the upper mold 40 and the lower mold 45 in a state where the silver body 23 is inserted into the insertion space 24 of the mixer blade 22, the silver body 23 which is relatively soft is transformed, and so, a portion of the silver body 23 is fit into the grooves of the screw thread 24a so as to provide strong binding force.

As described above, the screw thread 24a is formed on the inner periphery of the insertion space 24 in order to improve binding force between the insertion space 24 and the silver body 23, but instead of the screw thread 24a, a slit 24b which has a diameter larger than the inner diameter of the insertion space 24 may be formed along the inner circumference of the insertion space 24.

In this case, since a portion of the silver body 23 is inserted into the slit 24b when the silver body 23 is compressed, the binding force between the silver body 23 and the insertion space 24 is increased so as to improve durability.

Furthermore, without regard to the method that the screw thread is formed on the inner periphery of the insertion space 24 or the method that the slit is formed on the inner periphery of the insertion space 24, the insertion space 24 is formed in a hole, and the projections 23a of the silver body 23 mounted in the insertion space 24 can be respectively formed at the upper and lower sides of the mixer blade 22. Of course, the insertion space 24 is formed in a groove type, and the projection 23a of the silver body 23 mounted in the insertion space 24 can be formed only at the upper side of the mixer blade 22.

As described above, the preferred embodiment of the present invention can firmly fix the silver body 23 by forming the screw thread 24a or the silt 24b on the inner periphery of the insertion space 24 formed on the mixer blade 22 of the cooking mixer 200, thereby improving durability to prevent easy separation of the silver body 23 from the mixer blade 22. Moreover, the preferred embodiment of the present invention can increase silver intake into a human body by increasing silver content inside the food by maximizing a contact effect between the food and the silver body during the food grinding process since the projection 23a of the silver body 23 is projected to the outside from the surface of the mixer blade 22.

Additionally, the cooking mixer for supplying silver according to the preferred embodiment of the present invention naturally supplies silver to the grinded food, thereby helping the user to regularly take silver and detect poisonous matters contained in the food.

Moreover, the cooking mixer for supplying silver according to the preferred embodiment of the present invention can increase silver intake into the human body by increasing silver content inside the grinded food by raising a contact effect between the food and the silver body since a portion of the silver body projects from the surface of the mixer blade, and prevents separation of the silver body in spite of a long-term use since the silver body is firmly fixed on the mixer blade.

While the present invention has been described with reference to the particular illustrative preferred embodiments, it is not to be restricted by the embodiments but only by the appended claims. It is to be appreciated that those skilled in the art can change or modify the preferred embodiments without departing from the scope and spirit of the claims.

What is claimed is:

1. A cooking mixer for supplying silver, which includes a container for containing foodstuffs to be grinded, a power part for generating power, a connection part for separately connecting the container to the power part, and a rotatable body mounted in the connection part and connected to a rotary shaft of the power part, the rotating body having a plurality of blades for grinding the foodstuffs, wherein each of the mixer blades has at least one insertion space thereon for inserting a silver body thereto, the insertion space having a screw thread on an inner periphery thereof, a portion of the silver body mounted on the insertion space fitting into the screw thread, and the silver body having a projection protruding outwardly from the surface of the mixer blade.

2. The cooking mixer for supplying silver according to claim 1, wherein a screw and a washer for connecting the rotating body to the rotary shaft are made of silver or plated with silver.

3. The cooking mixer for supplying silver according to claim 1, wherein the insertion space is a hole or a groove on the mixer blade.

4. The cooking mixer for supplying silver according to claim 3, wherein the insertion space is a hole, and the projections of the silver body mounted on the inner periphery of the insertion space are at the upper and lower sides of the mixer blade.

5. The cooking mixer for supplying silver according to claim 3, wherein the insertion space is a groove, and the projection of the silver body mounted on the inner periphery of the insertion space is only at the upper side of the mixer blade.

6. A cooking mixer for supplying silver, which includes a container for containing foodstuffs to be grinded, a power part for generating power, a connection part for separately connecting the container to the power part, and a rotatable body mounted in the connection part and connected to a rotary shaft of the power part, the rotating body having a plurality of blades for grinding the foodstuffs, wherein each of the mixer blades has at least one insertion space thereon for inserting a silver body thereto, a slit having a diameter larger than the inner diameter of the insertion space being on the inner periphery of the insertion space along the circumference of the insertion space, the silver body mounted on the insertion space fitting into the slit.

* * * * *